United States Patent [19]

Pedlow

[11] 4,018,983
[45] Apr. 19, 1977

[54] ELECTRICAL ARC AND FIRE PROTECTIVE SHEATH, BOOT OR THE LIKE

[76] Inventor: J. Watson Pedlow, 2500 Pine Oak Drive, Media, Pa. 19063

[22] Filed: Apr. 9, 1975

[21] Appl. No.: 566,199

[52] U.S. Cl. ............................ 174/135; 106/15 FP; 138/177; 174/91; 174/121 A; 174/138 F; 220/63 R; 220/88 R; 252/8.1; 260/DIG. 24; 428/921

[51] Int. Cl.² .................. C09K 3/28; H02G 3/04; H01R 13/52; B65D 25/16

[58] Field of Search ............... 174/71 R, 74 A, 91, 174/121 A, 135, 136, 138 F; 106/15 FP; 220/63 R, 88 R; 252/8.1, 378 R, 378 P; 428/920, 921; 138/118, 177, DIG. 7; 260/DIG. 24

[56] References Cited

UNITED STATES PATENTS

| | | |
|---|---|---|
| 3,019,287 | 1/1962 | Newcomb, Jr. et al. ....... 174/138 F |
| 3,209,061 | 9/1965 | Mier et al. ................. 174/138 F X |
| 3,576,940 | 5/1971 | Stone et al. ................ 174/121 A X |
| 3,642,531 | 2/1972 | Peterson .................. 174/121 A UX |
| 3,928,210 | 12/1975 | Peterson ........................ 428/921 X |

*Primary Examiner*—Laramie E. Askin

[57] ABSTRACT

Electric arc and flame protective sheath or boot material for electrical, particularly for high voltage electrical, cables and complex electrical splices, junctures and the like, is precast preferably from a liquid polyvinyl chloride plastisol, preformed into a selected shape of a protective sheath or boot, reinforced and protected against destruction by pre-mixing with a filler of heat resistant fiber containing flame and fire-retardant plasticizer as well as fire-retardant, preferably intumescent, and heat stabilizing substances. The precast sheath or boot is flexible and elastomeric and may be sized and shaped to be slipped upon the cable or joint protectively to further insulate and protect it against electrical arcing, heat or fire.

17 Claims, 11 Drawing Figures

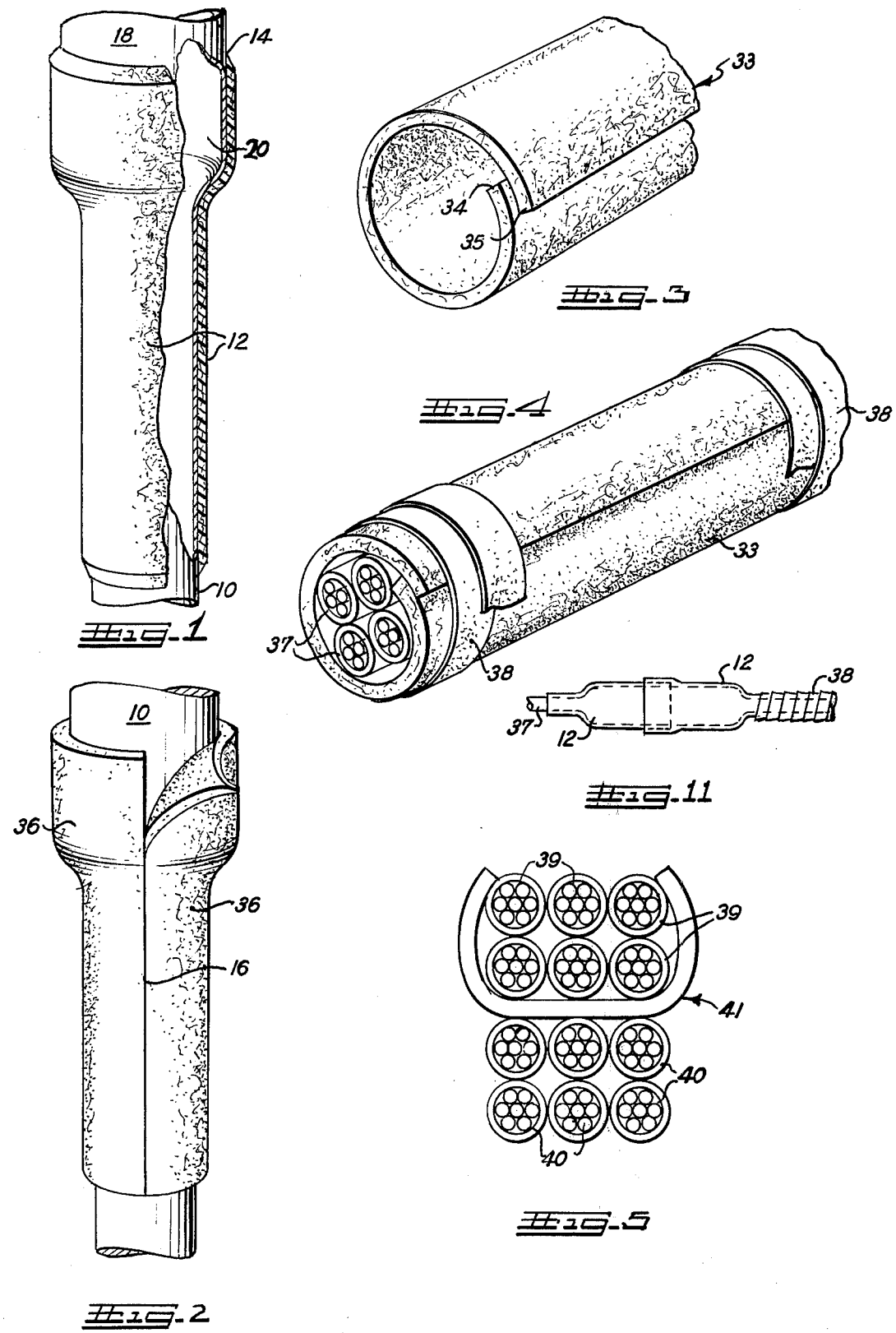

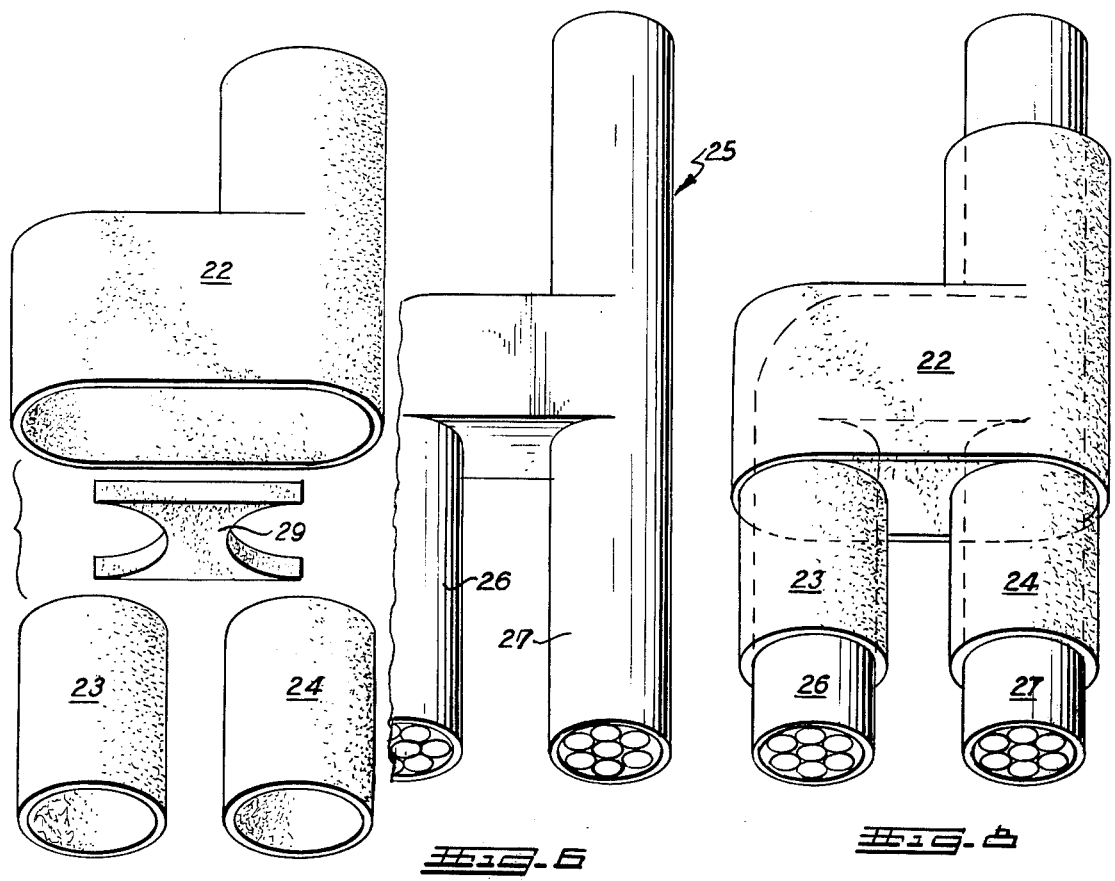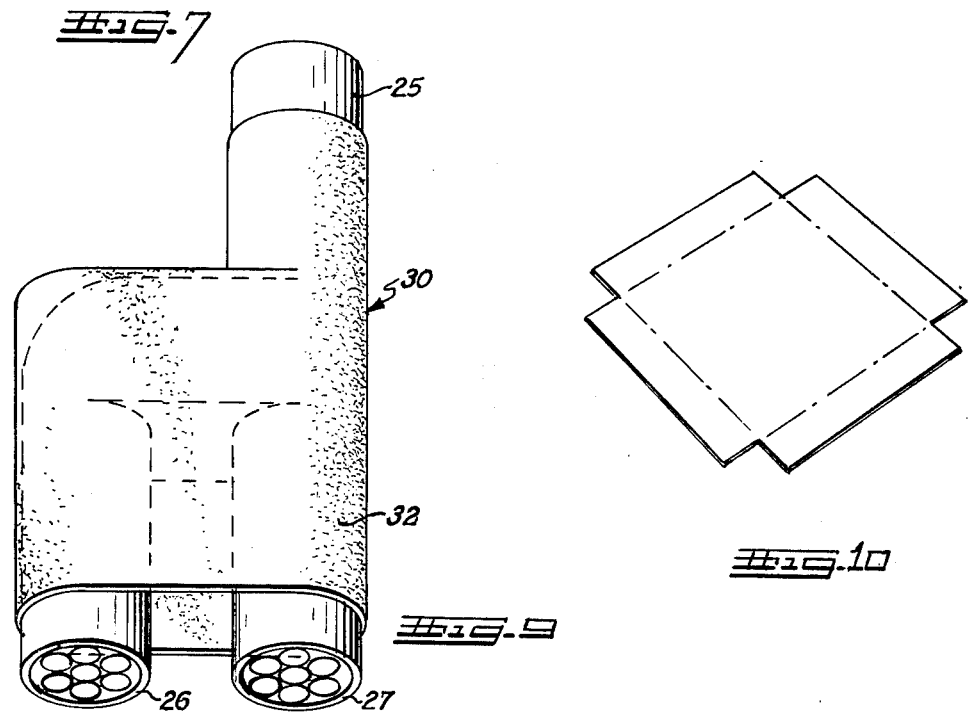

ELECTRICAL ARC AND FIRE PROTECTIVE SHEATH, BOOT OR THE LIKE

This invention relates to a shaped, precast or molded sheath, shroud or boot, for protectively mounting about electrical cables, splices, junctures and appurtenant electrical equipment, including high voltage as well as critical circuits, to fireproof and protect the same against electrical arcing, heat and flame damage, such as from short circuiting therein, or from fire developed in neighboring cables and equipment. More particularly the precast sheathing material comprises a low melting, easily formed thermoplastic resinous material, filled with a heat stable fiber to inhibit its fluidity before decomposition by heat, arcing and flame; and heat activated foaming, fireproofing and intumescing substances, to convert said protective sheathing to a fire and heat protective foam remaining protectively in place about the cable even after the base resin is decomposed by heat.

The sheath or boot hereof is variously sized and shaped to fit flexibly and be manually applied about a cable, or several cables, or cable splices, easily and quickly such as in assembling a cable network in a manhole; or about cables, transformers, electrical switch boxes or the like in buildings; the sheathing material forming a protective insulation, fireproofing the cable against arcing, high heat or flame in the sheath protected cables and equipment, or in neighboring cables.

It is known in the art to mount a flexible plastic such as rubber, polyethylene, polyethylpropylene, and even polyvinyl chloride commonly available as a plastisol upon a fibrous woven, non-woven knitted, netted or matted fiber fabric as a tape-like backing, or upon wire as a carrier for such coating, and to set the coating thereon with moderate heat. It is also known to apply such coating as a tape of flexibly winding about an electrical cable or upon complex cable splices for insulation thereof, usually against corrosion, ambient moisture or other minor contaminants. Such tape was proposed even to have various fibers or fabrics either embedded therein or used as a backing therewith for purely ambient temperature mechanical reinforcement.

The standards in the art for heat resistant tape, particularly to be applied about high voltage cable for fire and flame protection, are very high, and such tapes as were known are inadequate to satisfactorily meet such standards. For instance, protective tape for high voltage cable is now required to resist heat of great intensity such as might be developed in electrical arcing and short circuits, or by the flame or fire occurring from the spillage of oil from neighboring oil insulated cables and transformers disposed near the cables or equipment to be protected. The present standards of heat and arcing resistance for such tapes are that they must be resistant to directly applied destructive flame devices, including the heat developed by cutting torches or the like, tests against which such prior art tapes are ineffective.

One primary difficulty of ordinary insulating tape having a low melting resin base, such as polyvinyl chloride plastisol, most conveniently used, and even other low melting thermoplastics is that the resin melts and flows away under the applied heat, and will not therefore, protectively insulate the site where it is needed. Moreover, for rapid application to cables being assembled in a manhole juncture point for a high voltage cable network, and elsewhere, it is desirable to apply the protective covering about the cable as flexible precast bodies, sheaths or boots, easily assembled upon the cable as selected preformed shapes or annular lengths mountable upon cables or splices, or even irregularly shaped electrical junctures, switch boxes or the like, so that the preformed protective insulating sheaths can be quickly applied and secured about the electrical cables or equipment to be protected.

According to the present invention, a thermoplastic readily melted base resin has incorporated therein a high melting fiber substance, evenly distributed as a filler through the liquid or molten resin base, and tending as an absorbent or surface action of the encasing matted fiber to restrain the resin, even in the molten state, from flowing away from the protective matted fiber body with which it is encased. The resinous base composition further has incorporated intumescing or heat foamable substances, which upon heat activation under high temperature, fire or arcing conditions, tend to fire and flameproof the cable or other protective equipment. The sheath or boot composition is converted at the high arcing or applied fire temperatures above about 350° C to a foamy charred residue of the thermoplastic resin, which remains as a protective charred and foamy thick insulating coating upon the cable. The thermoplastic composition with its fiber and fireproofing composition therein is cast or molded at moderate temperatures at which the thermoplastic is fluid into various shapes useful for mounting about the cables or cable junctures which they are intended to protect.

The resinous base substance of the sheathing composition is a thermoplastic which will be fluid inherently at ambient temperatures such as a plastisol, or it may be a solid thermoplastic plasticized to melt and then set at moderate temperature, usually below about 300° C, and typically may comprise one of the thermoplastics such as synthetic rubber, typically polychlorobutadiene, polyethylene, ethylenepropylene co-polymer, polyvinyl chloride or the like. These thermoplastics may vary in molecular weight from low to high, generally above 5000 molecular weight, and will be selected to be moldable at a temperature below about 300° C, preferably below 200° C. The polyvinyl chloride (PVC) is preferred because it can be readily dispersed in solvating type liquids or plasticizers and whose swelling and gelating action just becomes effective when the plastisol dispersion is heated to a temperature in excess of 60° C. The preferred polyvinyl chloride resin has a viscosity of 0.9 to 2.25 c.p.s. as a 1% solution in cyclohexane at 30° C, but commonly in a preferred range of 1.10 to 2.10 c.p.s.

Generally, a plastisol is a blend of several dispersion grade, solvatable polyvinyl chloride (PVC) resins. Fine particles mixed with coarser particles are dispersed in a mixture of plasticizers.

Thermoplastic resins hereof are either solvated with a solvent to the plastisol form or may be plasticized so that it will flow with moderate heat, preferably below about 200° C, for coating and shaping as will appear. It is preferred that the plasticizer be a fireproofing, fire-retardant type of fluid. For that purpose it will be an organic phosphate, ester or chloride, generally of high molecular weight either aliphatic or aromatic in character. Suitable plasticizers are halogenated hydrocarbons, typically chlorinated or brominated paraffin waxes, polychlorinated carbocyclic compounds, such as hexachloro cyclohexane, octa chloro naphthalene, octo chloro diphenyl and chlorinated terpenes. Other suitable plasticizers are phosphoric esters, typically cresyl diphenyl phoshate, alkyl phosphonium halides, typically as shown in U.S. Pat. No. 3,322,861, tetrachloro or tetrabromo phthalic anhydride, phthalic acid esters of higher alcohols having 4 to 20 carbon atoms and such higher alcohol esters of dibasic carboxylic acids, such as adipic or sebasic acid, in which the acid group has 4–8 carbon atoms and the alcohol from 4 to 20 carbon atoms, and the alcohol or acid is preferably substituted with halogens such as chlorine or bromine, such as dibutyl tetrabromo phthalate, di(hexachloro decyl)adipic acid. The plasticizer can be diluted with heavy heat stable hydrocarbon liquids which will solvate the hydrocarbon and operate merely as an extender, typical extenders being heavy aromatic oils.

The thermoplastic resins and plasticizer composition, when and preferably in the form of plastisol, flows at ambient temperature such that it can be used for dipping, filling of molds for atmospheric pressure molding, or for rotational casting in electroformed, cast metal or ceramic molds that can be heated while in motion. The plastisol will gelate, becoming first solid, then fusing into a homogeneous mass as the temperature is increased. Typically, blends of PVC resins of varying particle sizes are used to provide a packing effect and regulate viscosity. The vinyl coating from a plastisol is most easily applied, and items can be dip molded therefrom by bringing any hot surface, metal or ceramic, into contact with it. Upon dipping the preheated form in the plastisol, gelation first occurs and the thickness of such gelled coating is regulated by the duration of immersion and temperature of the dipping form. The resultant coated form is slowly withdrawn and the plastisol still adhering rapidly gelates. Normally there may be sufficient heat in the form or mandrel to complete the fusion up to coating thicknesses of 0.030–0.050 inch. However, with thicker deposits, i.e., in the range of 0.060 to 0.300 inch, in which this invention is best practiced, it becomes necessary to complete the fusion by the application of additional heat at 150° to 200° C.

The chlorinated or brominated plasticizer will evolve halogen at high flame or arcing decomposition above about 400° C temperature but it cooperates with other volatizable fire-retardant compounds in the composition which together react at the heat decomposition temperature to form compounds which have a fireproofing or retarding effect. Such other compounds typically are antimony oxide alone or coated upon calcium carbonate and organic borate complexes, usually with carboxylic acids including naphthenic acid. Other useful plasticizers are chlorinated and/or brominated derivatives of dioctyl phthalate, didecyl phthalate, normal octyl-normal decyl phthalates (mixed), diallyl phthalate, butyl benzyl sebacate, etc.

Suitable organic phosphate ester plasticizers include, for example, tris(2,3-dibromopropyl)phosphate, tri(-bromocresyl)phosphate trichloroethylphosphate, tri(-bromoxylenyl)phosphate and the like.

Non-halogenated dicarboxylic acid ester plasticizers may also be used to supplement the fire-retarding (halogen or phosphorus containing) plasticizer and may be added in amounts up to about 90 parts by weight of the total plasticizers. Advantageously, at least about 20 weight percent of the total plasticizers is supplied by chlorinated hydrocarbons.

The resinous composition further includes a heat stabilizer substance which is usually a complex salt or organic or inorganic acid of such elements as barium, cadmium or zinc of which its typical compounds are naphthenates or thiolates of these metals. Other heat stabilizing salts such as lead phosphate, lead phosphite, zinc phosphite and barium phosphite may be used.

Suitable stabilizers are those which normally exist as solids, and include, for example, dibasic lead phthalate, dibasic lead phosphate, tin mercaptides, etc. A preferred heat stabilizer is dibasic lead phosphite.

The resinous composition further includes a fiber stabilizer which comprises short fiber lengths generally ranging upward from about ⅛ of an inch, indefinitely longer, but usually less than 1½ inches, the size being of significance only in that the liquid composition is difficult to mix homogeneously with a longer fiber. Consequently, the fiber length will usually be in the range of ¼ to ¾ inches. The fiber is homogeneously mixed with the resin and fire-retardant heat stabilizer substances. The fibers as stated are heat stable and will resist heat decomposition in the composition generally above the temperature of the decomposition temperature of the resin per se, usually above 350° C, so that as the composition begins to decompose with heat, the fiber nevertheless tends to hold the fluidized body, fused under heat, from flowing away from the flame or arc. The fibers are evenly distributed throughout the resinous body in quantity usually exceeding about 1 part, and may range from about 1 to 10 parts, by weight of fiber per 100 parts of base, usually ½ to 3 parts will suffice to provide this function. The fiber for this purpose may be glass fiber or a nylon type of heat resistant fiber such as a polyamide typically aramide which is available commercially by DuPont under the trade name Nomex. Other inorganic fibers such as barium titanate, carbon filament, asbestos, graphite, fiberglass or other high temperature stable fibers can be used.

The composition preferably further includes intumescing or foaming components which constitute a porous inorganic body which occludes air or moisture and which upon heating tends to expand by release of the occluded air or vaporization of absorbed or bound moisture, whereby the resinous composition intumesces or expands as a foamy body under high temperatures generally above about 350° C. Such components may be micas such as expanded or unexpanded vermiculite, perlite, bentonite or various hydrous oxides typically hydrous alumina, hydrous magnesia, hydrous silica, ferric hydroxide or the like. Such components tend to evolve steam when heated to an activating temperature, even lower than the critical temperature stated. Such steam evolving components begin to evolve the moisture as low as about 220° C, variable with the specific substance, and cause the composition to expand into a foam. The gas evolving component may be cenospheres, tiny glassy balls obtained as fly ash.

The cenospheres are included in the plastisol composition in amounts of about 1 to 25, preferably about 5 to 25, parts per 100 parts by weight of polyvinyl chloride. Their presence in the plastisol affords a multiplicity of advantages: increased flame resistance, lower density, lower thermal conductivity, improved thixotropic properties and lower cost. Cenospheres are chemically inert, hollow, glassy microspheres obtained from the ash remaining after burning pulverized coal. At the coal burning electricity generating stations where cenospheres may readily be obtained, the pulverized coal ash is made into a slurry with water and pumped into a lagoon. The cenospheres, which make up from about 0.5 to 5% weight of the ash, float to the surface with small carbon particles adhering to them and may be collected. Cenospheres have a Moh's hardness of about 5. After washing and drying they have a bulk density of from 0.25 to 0.35 grm/cm$^{-3}$ and individual cenospheres have densities varying from 0.4 to 0.6 grm/cm$^{-3}$. Their particle sizes are generally in the range of about 5 to 150 $u$. About 5% have diameters less than 50 $u$ and about another 20% have diameters greater than 125 $u$. The wall thickness is about 5% of the diameter.

Cenospheres have a melting point of about 1200° C, and are made of what is essentially a silicate glass. The composition varies from batch to batch, as is shown in the following table:

| Component | Weight % |
|---|---|
| Silica | 55 to 61 |
| Alumina | 26 to 30 |
| Iron oxides (as Fe$_2$O$_3$) | 4 to 10 |
| Calcium (as CaO) | 0.2 to 0.6 |
| Magnesium (as MgO) | 1 to 2 |
| Alkalis (as Na$_2$O, K$_2$O) | 0.5 to 4.0 |
| Carbon | 0.01 to 2.0 |

The properties of cenospheres are discussed in greater detail in a paper by E. Raask (J. Institute of Fuel, Sept. 1958, p. 339) and in a Technical Bulletin (Nov. 22, 1967) issued by the Central Electricity Generating Board, London, England.

The cenospheres containing gas require a somewhat higher temperature such as above 350° C to expand, and consequently in combination with a moisture evolving component such as hydrous oxide, the protective effect of the expanding coating on the arcing cable is substantially enhanced.

Other useful but not essential components in the composition are pigments, fungicides and inert fillers such as calcium carbonate and the like.

The following is a general formulation of the protective composition in which the quantities are all based on the resin component set at 100 parts by weight.

| | Component | Parts by Weight |
|---|---|---|
| a. | Thermoplastic resin | 100 |
| b. | Flame retarding plasticizer (preferred range 50–125) | 10–150 |
| c. | Heat stabilizer (preferably 1.5–3) | 1–5 |
| d. | Fire-retardant intumescing component (preferaly 50–125) | 10–150 |
| e. | Heat resistant short fibers (preferably 1.5–3) | 1–4 |
| f. | Other components (pigments, fungicides etc.) Optional | Q.S. |

In forming the composition into shaped bodies, protective sheaths, boots and the like, the composition homogeneously blended when solid is first heated to a softening temperature below about 300° C, and cast or extruded or deformed while hot, into a desired shape, generally using a mold in the case of a solid composition, or, preferably, merely by dipping a heated mandrel or other form of desired shape into the liquid composition, such as the plastisol blend, as described above.

In the case of the plastisol, which is the easiest method of handling the composition, the mandrel will be heated to a gelating temperature, usually about 150° to 200° C, and the hot mandrel is thus dip coated with a coating of the liquid plastisol, to a desired thickness. For example, it can be coated in a thickness in the range of about 0.025 inch up to the desired thickness, usually less than 0.5 inch, preferably 0.05 up to 0.250 inch. The hot coated mandrel is removed from the plastisol bath and the coating sets by hot gelation to the solid sheath or boot, which is then stripped from the mandrel in any of several ways.

The mandrel surface can be lubricated and the coating can be blown off by inserting a tube carrying a gas, such as air between the cast boot or sleeve upon the mandrel or through fine perforations in the mandrel surface, and the air under low pressure loosens and removes the flexible cast plastic film thereon. Alternately, the cast plastisol film can be cut by being split longitudinally and peeled off the mandrel, but it will retain its elastic memory, its original cast and set annular shape. The product is formed in a dough mixer by blending at room temperature the liquid plasticizer and polyvinyl chloride. Preferably the polyvinyl chloride is added to the plasticizer in the mixer in two or three small increments to thoroughly wet and distribute the same quantity as it is wet and mixed.

The short lengths of heat stable fiber are than added and homogeneously dispersed in the liquid resin. The solid heat stabilizer and fireproofing components are then added in the requisite quantity, including any optional components, pigments, fungicide and sometimes inert filler. The addition of the cenospheres is attended by some foaming since the heat expands and displaces the trapped gas therein, and the mixing is continued until the evolution of gas, such as air bubbles therein ceases. Sometimes, it is useful to apply a vacuum to reduce the foaming time. The plastisol composition after adding the various filler components is a viscous liquid, and will usually be in the range of about 5,000 to 50,000 cps at 25° C.

The invention is further described by a reference to the drawings showing several forms and the procedure for casting to form a shaped sheath-like body, such as a boot.

FIG. 1 shows the coating of a mandrel with a plastisol with parts cut away and in section showing the structure of the dipped assembly;

FIG. 2 is a similar view showing the manner of splitting the coating on the mandrel to remove the cast boot;

FIG. 3 shows a cylindrical sheath or boot cast upon a mandrel to have overlapping edges;

FIG. 4 shows an assembly of a cylindrical sheath or boot having overlapping edges wound about several cables as a bundle and taped in place;

FIG. 5 shows the manner of separating groups of cables, the sheath acting as a protective membrane or partition separating cable groups one from the other; or for protecting grouped critical cables (control as in generating plant) in cable trays.

FIG. 6 shows a simple splice of two cables into a third continuing cable;

FIG. 7 shows protective boots in a group, one adapted to fit over the top of the cable of FIG. 6 and two others on the individual cables being spliced thereto;

FIG. 8 shows the assembled sheath elements of FIG. 7 upon the cables of FIG. 6;

FIG. 9 is a modified boot as a single cast element adapted to totally cover a spliced joint of the type shown in FIG. 6;

FIG. 10 is a sheath formed as a rectangular casing adapted for fitting about a switch box with its several sides knocked down for shipping and unfolding for mounting;

FIG. 11 shows a cable splice with boots interfitted from both cables to surround the splice.

Referring first to FIG. 1, a mandrel 10 which may be a tubular metallic or ceramic body of selected shape and dimensions is dipped in a plastisol composition such as described herein. The tube 10 may be heated to a moderate temperature of about 200° C and the interaction of heat from the mandrel with the liquid plastisol will cause a film of the plastisol to gelate and set upon the heated mandrel, forming a coating 12 thereon. The heat set coating 12 may be removed readily from the mandrel in several ways. It is flexible and an air tube 14 may be inserted under an upper edge loosening the boot from the mandrel, whereby it may be blown off. Alternately the tube 10 can have a heat resistant coating thereon, such as graphite, Teflon or silicone whereby to impart a lubricating mandrel surface, and thus allow the cast tube 12 to easily slide off by manually applied pull from the mandrel 10. In a third alternate, as shown in FIG. 2, the cast annular sheath may be split by being cut longitudinally such as with a knife cut applied at 16, whereby the tube in toto may be opened up flexibly in a radial direction and peeled easily from the mandrel manually. With its normal elastic memory the tube will resume its tubular shape as cast, and thus be readily applied to a cable and taped in place.

As shown in FIGS. 1 and 2, the mandrel may be shaped with a flared larger diameter at an upper end 18, narrowing at 20 to a smaller diameter tube as shown at the lower end. Various shapes and sizes of mandrel will be selected to produce the sleeve, sheath or boot sized for fitting about the cable or splice intended.

FIG. 6 shows a complex electrical joint in general contour and several boots are shown in FIG. 7 as portions 22, 23 and 24, the upper portion 22 being shaped to be mounted about the upper portion 25 of an electrical splice and the lower legs 23 and 24 being mounted about each cable leg 26 and 27 as shown in FIG. 8. A separator bracket 29 is fitted between the cables to hold it in place as shown in FIG. 8. This butterfly shaped separator bracket piece is inserted in the open elliptical end of the boot to effect a seal against fire. Two such seals may be used in the assembly, one to fit on the way into the crotch and the other at the extreme open end. These filler pieces may be about ¾ of an inch thick and cast from the same fireproofing resinous formulation.

As shown in FIG. 9, a boot for the same cable splice 30 may be formed in elongated form, that is, with a longer skirt portion at the lower end 32 to cover both cables 26 and 27 and to replace the smaller cylindrical sheaths 23 and 24, a choice of convenience for more rapid application to the same original cable splice 25 to be protected.

As shown in FIG. 3 the sheath 33 can be cast around a cylindrical mandrel in which the edges are separated spirally to form the sheath correspondingly into a spiral with the edges 34 and 35 overlapping and split. That kind of sheath is highly flexible to encase one or several cables as shown in FIG. 4. Where several cables are to be encased, it can be with an overlapping edge sheath of FIG. 3, assembled as shown in FIG. 4, or with merely a single split cylindrical sheath 36 of FIG. 2 assembled around one or more cables 37, so that the edges just meet. The packing 33 of FIG. 4 can be further secured about one or a group of cables by the application of additional tape 38, fiberglass tape or fiberglass tie cord wound spirally either over the entire length or small portions thereof, sufficient to secure the sheath in place. The sheath material while shown to be cast as an annular body 12 in FIG. 1, which may be a split body 36 or an overlapping body 33 in FIGS. 2 and 3, can be of any selected hollow or annular shape 41, merely sufficient to flexibly embrace a group of cables 39 as shown in FIG. 5. For instance, the cables 39 are separated by the sheath 41 for various classifying reasons, perhaps that one group of cables is more fire prone or needs more fire protection, or would be more likely to arc or perhaps is needed to protect a more preferred group of cables. The sheathing material 41 is adapted to provide the coating or protection for any selected group of cables. For instance, the separated group of cables 40 could also have one or more wrappings such as 38 or 33 protecting one or more groups of cables, not shown.

As shown in FIG. 10, the sheathing can be knocked down for being assembled in a box-like form, sized to fit about and protect a switch box or the like, and of course it may have one or more holes cut in the walls thereof (not shown) to permit entry of cables and which may be protected as shown in FIGS. 6 to 9.

Referring to FIG. 11 a pair of boots 12 one sized slightly larger than the other are mounted on opposite cable ends 37 and after completing the splice, are slided to cover, one sized to encase the other at its end as shown. The ends of boot 12 may be wrapped with a tape as shown in the companion tape application referred to above.

Optionally, a fungicide which is compatible with the plasticizer system may also be included in the composition. Suitable fungicides include metallo-organic complexes wherein the metal is mercury or arsenic. As a preferred fungicide may be mentioned the condensation product of 10,10′-oxybisphenoxarsene and epoxidized soybean oil. The fungicide, if employed, should be present in minor, effective amounts, say about 0.2 to 8 parts per 100 parts by weight of polyvinyl chloride resin.

The physical admixing of the components of the plastisol composition may follow well-known methods. The plasticizers, if more than one be employed, may first be blended together, a portion of the blend set aside for later addition, and the polyvinyl chloride resin incrementally added to the blend with agitation until uniform dispersion is obtained. Next, there may be added slowly with continuous mixing the heat stabilizer, alumina hydrate, and any fungicide, supplementary fire-retardant, filler, pigment, etc., to be included, after which the remaining plasticizer is incorporated, again mixing until uniform. The cenospheres may then be blended into the composition and, if desired, the final composition may be subjected to vacuum deaeration.

The following examples illustrate the practice of this invention:

EXAMPLE I

Polyvinyl chloride plastisol in quantity of 72 parts mixed with 28 parts of polyvinyl extender resin, a coarser polyvinyl chloride of particle size in the range of about 50–100 mesh, is blended in a dough mixer with 92 parts of cresyl diphenyl phosphate, 23 parts of chlorinated paraffin wax (chlorowax 500) and an extender of 24 parts of heavy aromatic oil, such as a mixture of lower alkyl benzenes (Eseoflex 150) and a heat stabilizer, a mixture of barium, cadmium and zinc thiolate with small quantities of lead naphthenate in quantity of 2 parts, all parts being by weight. Into the mix is added 3 parts of antimony oxide, 60 parts of hydrous alumina having 38% of water of hydration and 40 parts cenospheres (fly ash). There is further added 2 parts of heat stable fibers which are fire-resistant aramide having mixed lengths between ¼ inch and ⅜ of an inch sold by DuPont as fiber floc under the trade name Nomex. Finally, 7 parts of titanium dioxide pigment, 1 part of calcium oxide and 1 part of fungicide 10'10' oxybis phenoxarsene (vinyzene BP.5). The components are mixed in a dough mixer at room temperature, first supplying all but about ¼ of the plasticizer and extender liquids, and then in three small increments the polyvinyl chloride, first blending one to complete liquidity before the next is added, and thereafter the solids are stirred into the mixture with slow continuous mixing. A small amount of a final quantity of plasticizer is added as a final thinner with the last added cenospheres. The final fluid mix has a viscosity of about 10,000–45,000 c.p.s. at 25°–27° C measured with a number six spindle at about 10 r.p.m. A stainless steel mandrel as shown in FIG. 1 which has a lower portion of a diameter of about 1½ to 3 inches and an upper flared portion with a diameter of about 3 to 6 inches respectively, faired smoothly from one diameter to the other, is preheated to 150° to 210° C and dip coated on its outer surface as it is slowly rotated with the composition as formed above. A coating having a thickness of about 0.125 inch remains, and it is set by the heat transferred by the hot mandrel into a gelated film. Further heat may be applied to complete fusion by placing the coated part into an oven at 175° to 200° C or immersing in molten salt at 200° C. On cooling the film is slit longitudinally by a knife blade and peeled from the mandrel. The boot was mounted about an inner lead sleeve in close surface contact thereon, and the assembly was exposed by mounting it above the tip of a flame of a Fisher burner having a tip temperature of 1700° F (plus or minus 50° F). The heat did not melt or sag to expose the lead and therefore the lead did not melt during a 20 minute exposure to this temperature. Moreover, a thermo couple inserted within the lead sheath to measure the temperature during the test ranged from 75°–195° F well below the melting point of the lead, indicating the great merit of this protective boot.

EXAMPLE II

Example I was repeated except that the cenospheres, alumina hydrate, as well as the fireproof fiber were omitted from the formulation substituting 50 parts of calcium carbonate, ground marble, as filler and the boot formed, as described in Example I, and mounted about a lead sleeve was similarly heated by a Fisher burner flame. The boot protected lead sleeve melted in 1.25 minutes, indicating that the fiber contributes largely to holding the molten structure together until the charred, foamed mass takes over the supporting and heat insulating function. Again, when the heat resistant fiber was omitted, but still including alumina hydrate and cenospheres, the lead sleeve was completely melted in less than 10 minutes. It is clear that both the fiber and fireproofing intumescing components of this composition contribute substantially to the protective value of the sheath or boot hereof.

Certain modifications will occur to those skilled in the art. Many other commonly used components of the fireproofing composition may be included here. Other stabilizer substances of the character of heat stabilizers, fungicides, pigments or the like may be varied. The term molded or cast product is used herein in a generic sense to include extrusion, spray and knife or doctor coating in laminate or layer form, and other forming processes to convert the solid plastic form hereof to a useful shape for the purpose intended.

Accordingly, it is intended that the description be regarded as exemplary and not limiting except as provided in the claims.

I claim:

1. A precast electrical arc and fire protective sheath, boot or the like in the form of a separately manually mountable protective unit for disposition about electrical equipment, cables, cable splices, appurtenant equipment or the like, said unit comprising a heat fused, and molded thermoplastic base having evenly distributed therein a heat resistant fiber, heat stable above the melting point of said thermoplastic base, and fire-retardant substances, said fiber adapted to hold heat molten thermoplastic from flowing, said unit being molded from a suspension containing no water other than chemically bound water, said fire-retardant substances being heat activatable at high arcing and flaming temperatures to release fire protective gases to convert said protective unit into a foamed heat insulating coating when mounted about electrical equipment, such as cables, cable splices, appurtenant equipment and the like.

2. The electrical arc and fire protective sheath, boot or the like as defined in claim 1 longitudinally slit for elastic deformation about a cable to be encased therewith.

3. The electrical arc and fire protective sheath, boot or the like as defined in claim 2 shaped as a tubular body for mounting annularly protectively about a cable.

4. The electrical arc and fire protective sheath, boot or the like as defined in claim 3 wherein the edges of said unit are cast to overlap and the unit is mountable about said cable with its edges overlapped.

5. The electrical arc and fire protective sheath, boot or the like as defined in claim 1 wherein the unit is cast as a boot to fit about a non-symmetrical cable splice.

6. The electrical arc and fire protective sheath, boot or the like as defined in claim 1 wherein the unit is precast in a shape to encase a group of cables.

7. The electrical arc and fire protective sheath, boot or the like as defined in claim 1 wherein the thermoplastic base is a plastisol, the fiber is heat stable above 300° C and the plastisol contains a plasticizer comprising a fire-retardant liquid.

8. The electrical arc and fire protective sheath, boot or the like as defined in claim 7 wherein the heat resistant fiber is inorganic.

9. The electrical arc and fire protective sheath, boot or the like as defined in claim 7 wherein the heat resistant fiber is carbon.

10. The electrical arc and fire protective sheath, boot or the like as defined in claim 7 wherein the heat resistant fiber is mineral fiber.

11. The electrical arc and fire protective sheath, boot or the like as defined in claim 7 wherein the heat resistant fiber is fiberglass.

12. The electrical arc and fire protective sheath, boot or the like as defined in claim 7 wherein the fiber is short lengths of aramid heat resistant fiber.

13. The electrical arc and fire protective sheath, boot or the like as defined in claim 7 wherein the plastisol is polyvinyl chloride plastisol, the heat resistant fiber is aramid and the fire-retardant substances include a foaming agent selected from the group consisting of cenospheres, hydrous oxides and metals forming heat volatilizable chlorides.

14. The electrical arc and fire protective sheath, boot or the like as defined in claim 13 further including a heat stabilizing substance for said plastisol.

15. An electrical arc and fire protective sheath, boot or the like as defined in claim 13 wherein the unit is precast as a knock-down rectangular box-like casing having its sides in knock-down form and then foldable in use to form a rectangular insulating box for mounting protectively about an electrical switch box or the like.

16. The electrical arc and fire protective sheath, boot or the like as defined in claim 1 wherein the thermoplastic base is a heat set plastisol with a fire-retardant plasticizer and the fiber is heat stable at 300° C, and further including a heat stabilizer for said plastisol, and as a fire-retardant substance, at least one member of the group consisting of a hydrous oxide, cenospheres, and metals convertible by heat and volatile halogen to a fire protective volatile halogen compound evenly distributed in said plastisol.

17. The electrical arc and fire protective sheath, boot or the like as defined in claim 1 wherein the unit is precast and foldable into a box-like protective casing for an electrical switch box or the like.

* * * * *